(12) United States Patent
Conners

(10) Patent No.: US 6,473,705 B1
(45) Date of Patent: Oct. 29, 2002

(54) SYSTEM AND METHOD FOR DIRECT NON-INTRUSIVE MEASUREMENT OF CORRECTED AIRFLOW

(75) Inventor: Timothy Raymond Conners, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 09/685,785

(22) Filed: Oct. 10, 2000

(51) Int. Cl.$^7$ .............................................. G01F 25/00
(52) U.S. Cl. ...................... 702/100; 702/104; 702/130; 250/343; 250/345
(58) Field of Search ................................ 702/100, 104, 702/130, 136, 183; 250/343, 345; 356/437, 440

(56) References Cited

U.S. PATENT DOCUMENTS

| | | | | |
|---|---|---|---|---|
| 5,813,767 A | * | 9/1998 | Calabro' et al. | ............. 250/345 |
| 6,064,488 A | * | 5/2000 | Brand et al. | ................. 356/437 |
| 6,157,455 A | * | 12/2000 | Pinvidic et al. | ............. 250/343 |

OTHER PUBLICATIONS

B.L. Upschulte et al., "Continuous Water Vapor Mass Flux and Temperature Measurements in a Model SCRAMJET Combustor Using a Diode Laser Sensor," Jan. 11, 1999, AIAA, Reston, VA.

M.F. Miller et al., "Design and Flight Qualification of a Diode Laser–Based Optical Mass Flux Sensor," Jul. 13, 1998, AIAA, Reston, VA.

M.G. Allen et al., "Diode Laser Sensors for Aeroengines: Lessons Learned and Future Promises," Jun. 15, 1998, AIAA, Reston, VA.

M.F. Miller et al., "Diode laser–based air mass flux sensor for subsonic aeropropulsion inlets," Aug. 20, 1996, Applied Optics.

M.G. Allen, "Diode laser absorption sensors for gas–dynamic and combustion flows," 1998, Meas. Sci. Technology, Andover, MA.

* cited by examiner

Primary Examiner—John S. Hilten
Assistant Examiner—Hien Vo
(74) Attorney, Agent, or Firm—William Scott Andes; Pierce Atwood

(57) ABSTRACT

A method for determining corrected gas flow values from measured physical gas flow values is provided. A laser-based sensor system is deployed in a duct through which the gas moves. The sensor system includes two or more pairs of photoemitters/photodetectors that emit and detect light beams. Spectral changes in the light beams associated with the laser sensor system caused by the properties of the gas passing through the duct are referenced to known gas physical properties, including density. That information as well as the velocity of the gas and the temperature in the duct are analyzed and manipulated in a programmed processing unit. The processing unit is programmed to calculate a corrected gas flow value from the information obtained directly and indirectly from the detected light beams. The system and the method for obtaining the corrected flow value are suitable for use in the determination of corrected airflow through a duct, including a duct of an aircraft engine.

19 Claims, 3 Drawing Sheets

SYSTEM AND METHOD FOR DIRECT NON-INTRUSIVE MEASUREMENT OF CORRECTED AIRFLOW

BACKGROUND OF THE INVENTION

This invention relates generally to systems and methods for measuring airflow in ducts and more particularly to a system and a method for determining corrected airflow, including in aircraft turbines.

Turbines used for powering an aircraft in flight typically include, in serial communication, an air inlet duct, a fan, a compressor, a combustor, a turbine, and an exhaust duct. The combustor generates combustion gases that are channeled to the turbine where they are expanded to drive the fan and compressor. The turbine is drivingly connected to shafts coupled to the fan and compressor. Combustion is achieved by mixing ambient air with fuel and igniting the mixture. The efficiency and effectiveness of operation of the engine are dependent upon compression system pressure ratio and the air/fuel mixture and so an understanding of the airflow and the regulation of that airflow are of importance.

As indicated, the operation of the turbine engine relies on suitable ratios of air and fuel in the combustion process. It is particularly important in the field of aircraft engines that operating conditions are maintained as accurately and safely as possible. For that reason, airflow measurements are of value in assessing operating conditions of the engine. Parameters that may be assessed using airflow values under operating conditions include engine control, engine stability, engine monitoring and performance evaluations.

For a steady-state operating condition of a turbine engine, such as at a fixed throttle setting, physical airflow varies significantly as intake flow properties change. This airflow variability may be associated with changes in air density, temperature, and the like, most often associated with changes of altitude, speed and/or movement from one location to another. The variability of measured physical airflow can be reduced substantially through the process of standardizing flow data to produce a corrected airflow. The process of establishing a corrected airflow involves the manipulation of physical airflow values measured directly or indirectly to generate standardized values referenced to a common condition. For aircraft engine evaluation, the reference condition may be established by taking physical measurements through steady state operation at sea level in a stationary position.

As previously indicated, airflow values, corrected ones in particular, are of use in engine control functions, engine stability analysis, engine health monitoring, and performance evaluations. Obtaining accurate airflow data during engine design development and testing is a difficult and costly task. However, those data are necessary to verify design hypotheses and engine integrity. Moreover, they are required to create quality engine status models, engine control logic functions, and in-flight performance models.

Although accurate and reliable on-wing aircraft engine airflow measurement systems are generally considered most desirable, such systems are either not available or if available, simply not always feasible to deploy. Model-based correlation methods are therefore generally used to quantify airflow conditions. Unfortunately, these models, when relying upon physical flow data, are susceptible to multiple sources of error. As a result, modeling accuracies are limited for engines evaluated in off-line performance examinations and for real-time engine control. For this reason, additional engine stability margins must be established to ensure stall-free operation. Unfortunately, engine performance suffers when stability margins are increased. All of this leads to reduced performance for the engine user and increased development, analysis, and service costs to the manufacturer.

Physical airflow measurements are made for aircraft engines in a number of ways. The most common method is by pressure-based sensors installed within the turbine (engine) intake. Another method is by non-intrusive low-power laser-based sensors installed proximate to, but not directly in, the air stream to be measured. The pressure-based sensors are typically rake- or venturi-based flow meters that must be operated at steady-state flow conditions to be effective. They provide direct and highly accurate airflow measurement information. They also require the deployment of additional multi-probe rake systems to obtain the type of data, including air temperature, required to generate corrected airflow. Because of the expense associated with these rake or venturi systems, pressure-based sensors are unfeasible for use in mass-produced engines and can make ground-based development test structures prohibitively expensive. There are other limitations associated with the pressure-based sensors. Specifically, they cannot be used to collect meaningful flow data at high sampling rates because of probe response limitations and pneumatic lag. These are issues that do not affect laser-based sensors.

Diode laser-based airflow sensors are tuned to emit light at a frequency corresponding to a specific oxygen absorption feature within the electromagnetic spectrum. The laser beam is directed across an airflow path of interest, such as the engine inlet, and the emitted light is collected on the opposing side of the flow path. The resulting signal is proportional to the density of the air as evaluated by a signal analyzer. The laser-based sensors provide path averaging of the emitted light signal. This results in accurate outputs relatively unaffected by axisymmetric radial distortion associated with the airflow duct, regardless of laser beam orientation.

The non-intrusive laser-based flow sensor, typically diode configured, has the ability to measure simultaneously static temperature and physical airflow. Moreover, it is relatively easier to install for ground-test applications and for on-wing measurements in real-time conditions with little loss of accuracy. It therefore eliminates the need for complex airflow models designed to correlate test parameters with real-time conditions. The resulting data may be used directly in an engine control processing system.

Existing pressure-based airflow sensors are subject to providing unreliable physical airflow information under many test and real-time operating conditions. Corresponding correction of the physical airflow parameters obtained from such sensors requires complex modeling and supplemental multi-probe rake arrangements. Suitably accurate pressure-based sensors are therefore often too expensive to place in production or use in development testing. Laser-based sensors offer a desirable technique for feasibly obtaining reliable physical airflow information. However, what is needed is a feasible system and method for obtaining corrected airflow using laser-based sensors.

SUMMARY OF THE INVENTION

The above-mentioned need is met by the present invention, which provides a system and methodology for obtaining reliable corrected gas flow, and for aircraft engines in particular, airflow, values. The method includes generating a corrected gas flow value from a physical gas flow value for a gas moving through a duct of a gas turbine engine. This is achieved by applying a laser-based sensor to an interior of the duct and measuring the physical gas flow value $W_{Physical}$ of the gas with the laser-based sensor. The direct measurements provide for a non-intrusive technique to obtain data that is then used in a processing unit, such as any sort of computing system programmed to calculate the corrected gas flow value $W_{Corr}$.

The system to enable the described methodology includes the laser-based sensor system placed non-intrusively in the duct that is the gas flow passageway. The system also includes the processing unit coupled to the sensor system. In particular, the system of the present invention measures the physical gas flow value $W_{Physical}$ of the gas flowing through the duct and calculates the corrected gas flow value $W_{Corr}$ from $W_{Physical}$. The laser-based sensor is affixed to the interior of the duct and measures characteristics associated with physical parameters of the gas moving in the duct. The processor is coupled to the laser-based sensor for controlling operation of the sensor, receiving signal information from the sensor, and calculating $W_{Physical}$ and $W_{Corr}$. The sensor system includes two or more pairs of photoemitters/photodetectors aligned to one another in a way that generates gas flow velocity using a Doppler shift. The beams created by the pairs are also analyzed to generate absorption features that are used to generate gas density information. The processor may also be programmed to measure static temperature in the duct using a second laser beam and based on relative variations of absorption features between the two beams.

The present invention and its advantages over the prior art will become apparent upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
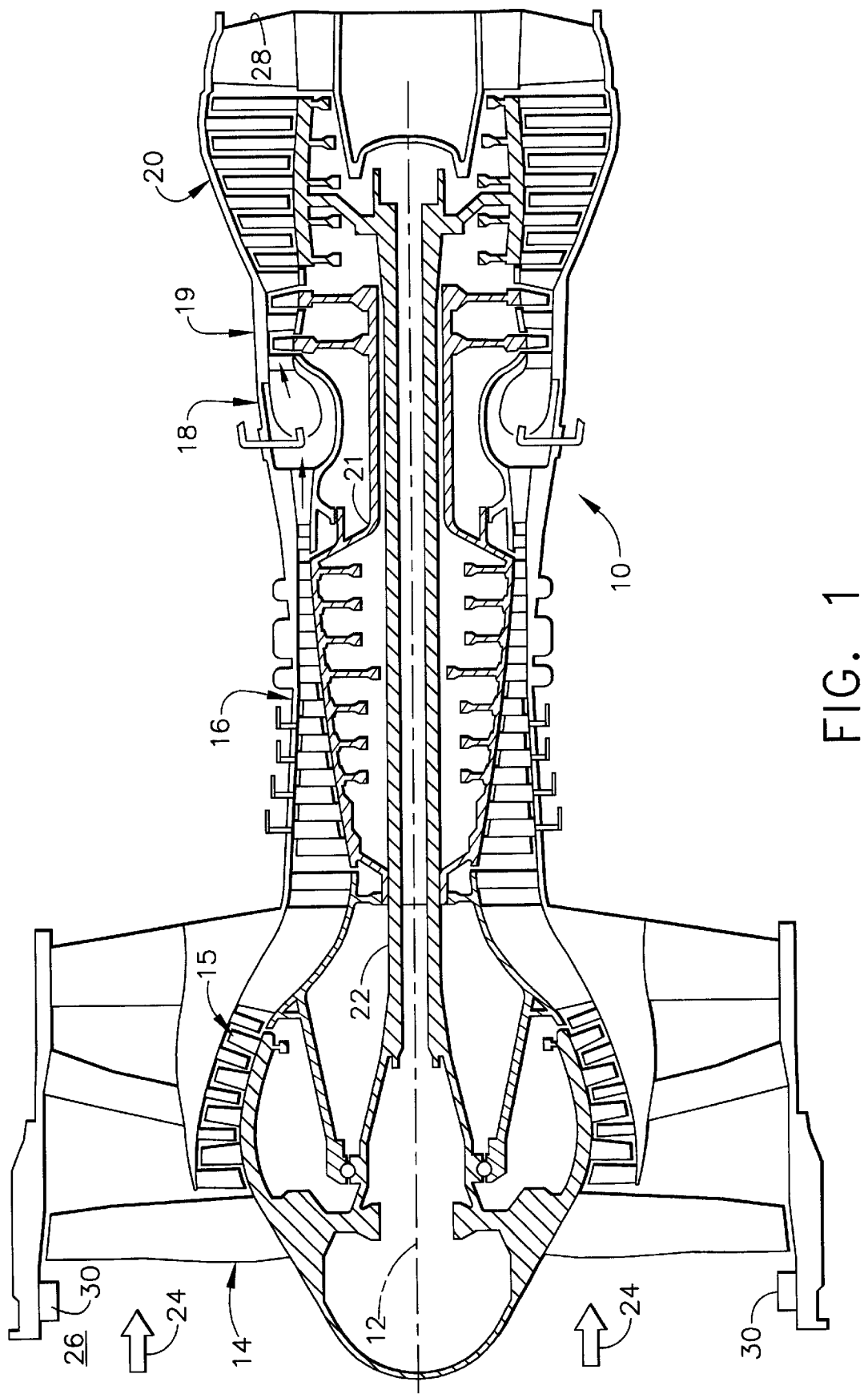
FIG. 1 is a simplified longitudinal cross-sectional view of a gas turbine engine including a portion of the laser-based sensor system of the present invention.

Referring to the drawings wherein identical reference numerals denote the same elements, FIG. 1 illustrates a longitudinal cross-sectional view of a high bypass ratio turbofan engine 10. The engine 10 includes, in serial axial flow communication about a longitudinal centerline axis 12, a fan 14, a booster 15, a high pressure compressor 16, a combustor 18, a high pressure turbine 19, and a low pressure turbine 20. The high pressure turbine 19 is drivingly connected to the high pressure compressor 16 with a first rotor shaft 21, and the low pressure turbine 20 is drivingly connected to both the booster 15 and the fan 14 with a second rotor shaft 22, which is disposed within the first rotor shaft 21.

During operation of engine 10, ambient air 24 passes through the fan 14, the booster 15, and the compressor 16 to be pressurized in succession. Some of the ambient air 24 is bled off for supplemental functions while the primary pressurized air stream enters the combustor 18 where it is mixed with fuel and burned to provide a high energy stream of hot combustion gases. The high-energy gas stream passes through the high-pressure turbine 19 where it is further expanded, with energy being extracted to drive the first rotor shaft 21. The gas stream then passes through the low-pressure turbine 20 where energy is extracted to drive the second rotor shaft 22 and, thus, the fan 14. Spent products of combustion and unused gas pass out of the engine 10 through an exhaust duct 28.

Of course, depending upon the specific dimensions and duties of the turbine engine 10, there may be a plurality of the various components shown. For the purpose of the description of the corrected airflow measurement and analysis system of the present invention, certain aspects of the operation of the turbine engine 10 will be given detailed attention. The focus of the description will be centered on data obtained through a laser-based sensor system 30 coupled to the air inlet duct 26 of the turbine engine 10. Specifically, the physical properties of that ambient air 24 entering the engine 10 are measured and analyzed by the sensor system 30. It is to be noted that the sensor system 30 may be deployed on the airframe, a fan bypass duct, or other region where airflow conditions are of interest.

Figure 2:
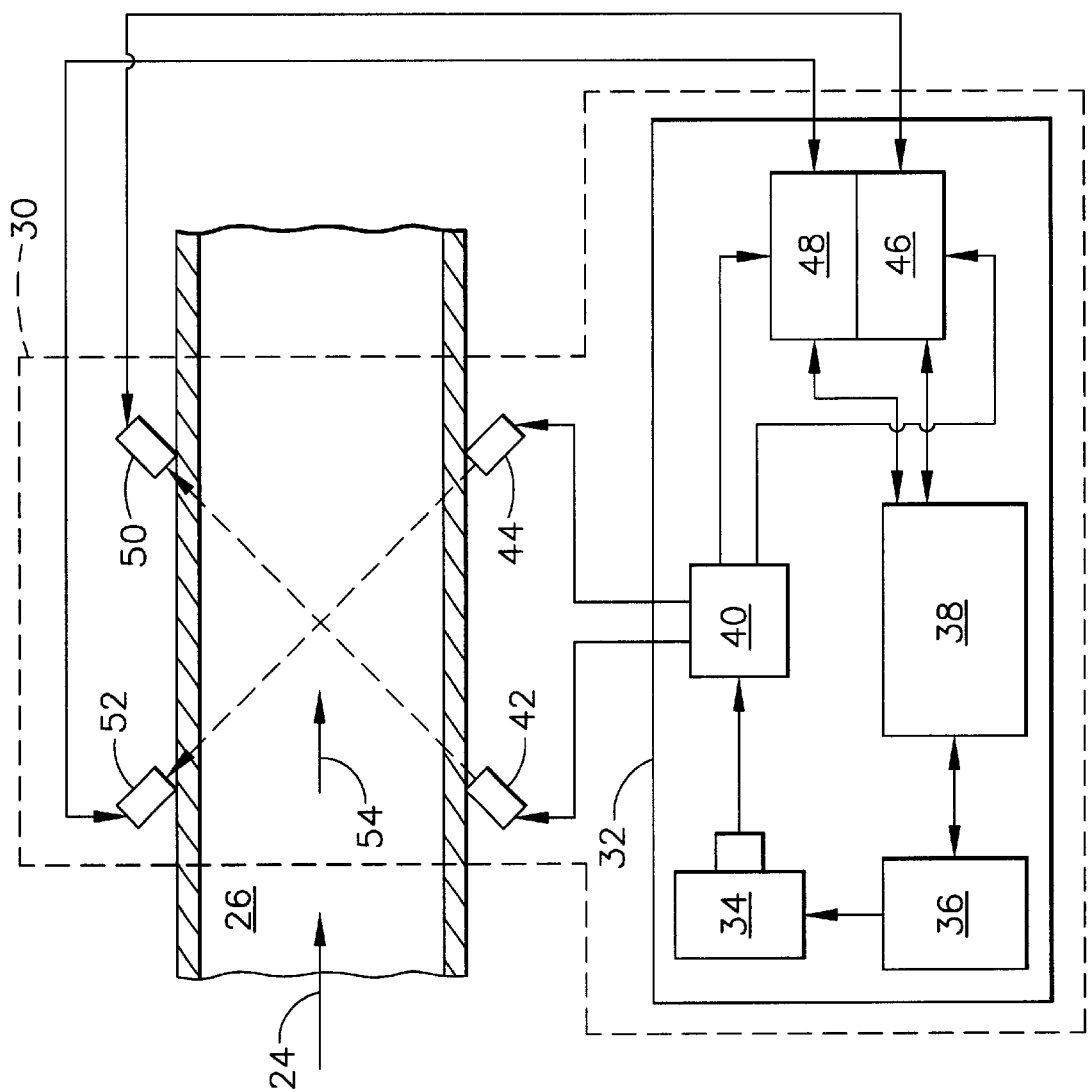
FIG. 2 is a simplified schematic diagram of the laser-based sensor system of the present invention showing the sensor system controller and the emitters and detectors coupled to a duct.

FIG. 2 presents a simplified representation of the sensor system 30 coupled to the air inlet duct 26. The sensor system 30 includes a sensor operation and analysis unit 32 used to regulate operation of laser components of the system 30 and to analyze the outputs from those components. The unit 32 includes a diode-based laser generator 34 operated by a laser controller 36. The laser controller 36 is controlled by a central processing unit 38 that may form an integral portion of the unit 32 or that may be coupled remotely, either through wired or wireless means, to the laser controller 36.

With continuing reference to FIG. 2, the processing unit 38 is programmed to propagate through laser controller 36 signals to the laser generator 34 to produce a low-power laser beam. That beam is processed through a beam splitter 40 that, for illustration purposes only, is a one-to-four beam splitter. The beam splitter 40 transmits the signaled beam to a first photoemitter 42 and a second photoemitter 44. The amplitude and frequency of the laser beams passing to emitters 42 and 44 is determined through the programming of processing unit 38 and the operation of controller 36, generator 34, and splitter 40. The beam splitter 40 also transmits the split beam signal to a first beam detector unit 46 and a second beam detector unit 48.

The first beam detector unit 46 and the second beam detector unit 48 include transmission means, such as optic fibers or wiring to transmit and receive either light or electrical transmissions to and from a first photodetector 50 and a second photodetector 52, respectively. Units 46 and 48 further include signal amplification means for increasing the amplitude of the electrical signals associated with the optical signals received from photodetectors 50 and 52. The amplified signals received from the photodetectors are propagated to the processing unit 38 for subsequent analysis and manipulation in conformance with the analysis methodology to be described.

While the sensor system 30 is shown in FIG. 2 to include two pairs of photoemitters/photodetectors, it is to be understood that alternative numbers of pairs may be employed, or that each pair may be formed of a plurality of sets of emitters/detectors. Further, the pair of units 42/50 and 44/52 are shown in FIG. 2 placed at an angle of about 45° from normal to the flow; however, they may be placed at angles as low as about 10° or as much as about 60°, dependent upon the particular required data quality and physical location constraints. Introduction of a second crossing beam aids in the calculation of gas flow velocity using a Doppler shift. A suitable system is made available by Physical Sciences, Inc., of Andover, Mass. The present invention includes the programming of the processing unit 38 to generate suitable corrected airflow values using the laser-based components of the sensor system 30.

In use, the sensor system 30 operates as follows. A laser beam is directed by photoemitters 42 and 44 across a gas flow path 54. The emitted light is collected by photodetectors 50 and 52, respectively. The line shape of the absorption feature of the detected beam is extracted and stored as data by processing unit 38. In particular, the integrated area of that absorption feature is known to be proportional to the density of the gas, in the manner to be described with respect to FIG. 3. The use of the second beam associated with the path between photoemitter 44 and photodetector 52, aligned at some selectable angle with respect to the first beam pair, creates a Doppler shifting of the data and provides for more reliable absorption waveform characterization. Direct flow velocity values are obtainable from the Doppler shifting. Upon calculation of the flow density, that information, the measured cross-section of the duct, and the measured flow velocity are used to calculate the path-averaged airflow through the duct. The path-averaged static temperature of the airflow may also be calculated based upon the relative sizes of integrated areas of neighboring absorption features, and requiring a second diode-based laser generator, such as generator 34, in order to produce the additional feature. Such a second generator operates at a frequency different from the operating frequency of the generator 34. The ratio of the absorption features resulting form the use of the two generators, compared to a reference value, permits the calculation of static temperature.

The processing unit 38 of FIG. 2 is programmed to calculate first physical airflow (units of mass per time) and then corrected airflow using the method described below. The physical airflow, $W_{Physical}$, through the duct 26 is measured with the sensor system 30 using the continuity equation $W_{Physical} = v\rho A$. The sensor system 30 determines the Doppler shift between the beams established by emitter/detector 42/50 and emitter/detector 44/52 to generate flow velocity v.

Figure 3:
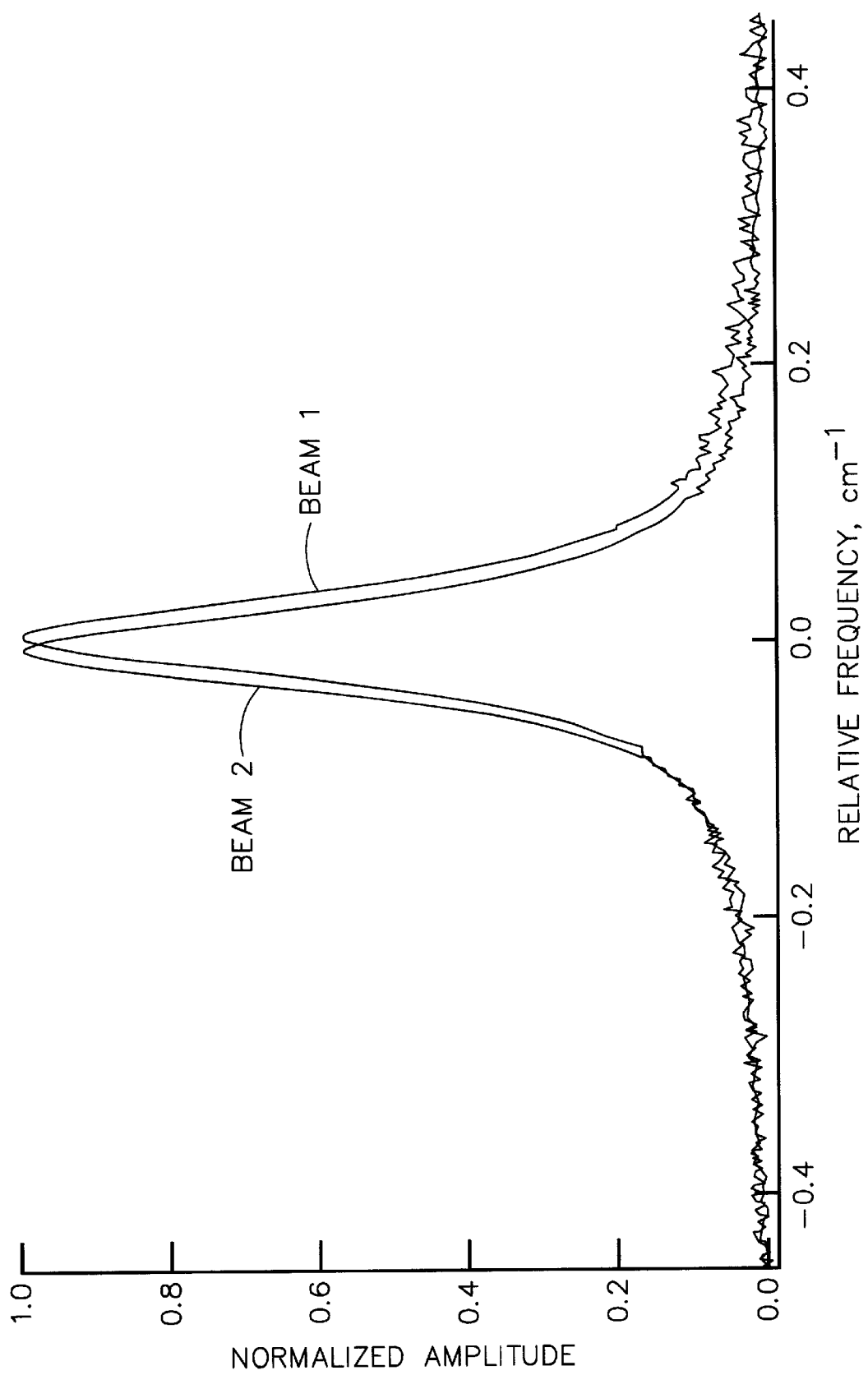
FIG. 3 is a waveform diagram of the normalized amplitude values for a sweep of measurement frequencies associated with operation of the sensor system of the present invention.

FIG. 3 presents an exemplar representation of curves generated by the amplified signals detected by photodetectors 50 and 52. As shown in FIG. 3, the frequency offset between Beam 1 associated with the emitter/detector pair 42/50 and Beam 2 associated with the emitter/detector pair 44/52, defines the flow velocity. Specifically, shifts in the frequencies of the two beams based on relative velocity differences between the beams and fluid may be used to calculate the flow velocity v. Next, the processor 38 of sensor system 30 is programmed to compare the integrated area under the beam curves of exemplar FIG. 3 to known calibration references associated with gas density. From that comparison, gas density $\rho$ at the measurement location is determined. Finally, the cross-sectional area A of the duct 26 is measured and incorporated into the equation to define the physical airflow at the measurement location using the sensor system 30.

Data obtained by using the sensor system 30 are input to processing unit 38 and the data retrieval and analysis programmed into the processing unit 38 based on the equations to be described herein generate corrected airflow information. One or more equations are used to determine the corrected airflow from the direct measured and calculated physical airflow values. In its most basic form, Equation (1), through reference Equations (2) and (3), establishes a first relationship between measured physical airflow and corrected airflow:

$$W_{Corr} = W_{Physical} \times (\sqrt{\theta}/\delta) \qquad \text{Eq. (1)}$$

$$\theta = T_T/T_0 \qquad \text{Eq. (2)}$$

$$\delta = P_T/P_0 \qquad \text{Eq. (3)}$$

where $W_{Corr}$ is corrected airflow, $W_{Physical}$ is the actual or observed airflow, $T_0$ and $P_0$ are constant standard day values for static temperature and static pressure respectively at sea-level. Further, $T_T$ and $P_T$ are stagnation temperature and pressure, respectively. Stagnation measurements are made by conventional measurement devices with detection mechanisms positioned axially and intrusively in the flow stream. Static measurements are those taken normal to, and out of, the flow stream. Static temperature may be calculated using the sensor system 30 and the addition of a second diode-based laser generator that may be substantially equivalent to generator 34. Specifically, the relative areas of neighboring spectral absorption features change with changes in temperature. Comparison of measured values to known absorption feature ratios for given reference temperatures may be made to calculate static temperature using the sensor system 30.

Equation (1) provides a suitable method for obtaining directly from the laser-based sensor system corrected airflow without the complex systems associated with pressure-based sensors. That corrected airflow is a more valuable environmental parameter than physical airflow to provide improved correlation between engine testing and engine operation and to provide simplified engine control. An alternative technique for obtaining corrected airflow while continuing to use readily available data obtained from the sensor system is presented in the following equation development. By applying the Ideal Gas law and isentropic flow equations, Equation (1) can be expanded into a form that does not rely on pressure and stagnation temperature measurements. Simply stated, the Ideal Gas law provides a correlation of the physical characteristics of a gas, such as air, such that a change in one or more of those characteristics can be used to determine a change in one or more of the other values. The Ideal Gas Law equation is $$PV = nRT \qquad \text{Eq. (4)}$$

Where P is the pressure of the gas, V is the volume of the gas, n is the number of moles of the gas, R is the universal gas constant, and T is the temperature of the gas. Since n/V is essentially the density of the gas, the Ideal Gas Law can be restated in terms of the physical characteristic density, $\rho$, as $$P = \rho RT \qquad \text{Eq. (5)}$$

For isentropic flow of a gas, which for the purposes of this analysis is deemed to be a perfect gas, $$P_T/P=(T_T/T)^{\gamma/(\gamma-1)} \qquad \text{Eq. (6)}$$

$$T_T=v^2/(2C_p)+T \qquad \text{Eq. (7)}$$

P and T are the static pressure and temperature, respectively, at the measurement location of interest, $\gamma$ is the ratio of specific heats for the gas, v is the flow velocity at the location of interest, and $C_p$ is the change of enthalpy with respect to temperature. $C_p$ can be re-defined as follows:

$$C_P=(\gamma R)/(\gamma-1) \qquad \text{Eq. (8)}$$

$\gamma$ varies with temperature, but can be set equal to about 1.40 for air within the operating envelope of a typical gas turbine engine. However, it is to be understood that any calculated or estimated value for y may be inserted into the equation. Substituting the right side of Equation (8) for $C_p$ in Equation (7) results in Equation (9) suitable for use with the average turbine engine operating envelope:

$$T_T=v^2/7R+T \qquad \text{Eq. (9)}$$

Re-arranging Equation (6), substituting the right side of Equation (5) into Equation (6), and setting $\gamma$ equal to 1.4 as earlier noted, results in Equation (10):

$$P_T=\rho R(T_T^{3.5}/T^{2.5}) \qquad \text{Eq. (10)}$$

Applying the correction Equations (2) and (3) to Equation (1) and substituting the right side of Equation (9) for $T_T$ and the right side of Equation (10) for $P_T$ results in Equation (11):

$$W_{Corr}=W_{Physical}\times(P_0/\sqrt{T_0})\times(T^{2.5}/(\rho R(v^2/7R+T)^3)) \qquad \text{Eq. (11)}$$

Equation (11) enables calculation of the corrected airflow from static temperature measurements, such as by using the sensor system 30 in the manner previously stated. Equation (12) provides an alternative method for determining corrected airflow from physical airflow measurements using conventional stagnation temperature measurement methods:

$$W_{Corr}=W_{Physical}\times(P_0/\sqrt{T_0})\times((T_T-(v^2/7R)^{2.5})/(\rho RT_T^3)) \qquad \text{Eq. (12)}$$

As those skilled in the art are aware, the processing unit 38 may be programmed to incorporate these derived equations into a method for determining $W_{Corr}$ from the information gathered from the photodetectors 50/52.

The foregoing has described a method for obtaining reliable corrected airflow values from direct and calculated physical airflow measurements. Additionally, it has described a sensor system programmed to make such measurements and make such corrected airflow calculations. The corrected airflow values may be employed for real-time engine control, engine stability information, engine operation monitoring, and performance calculations. While specific embodiments of the present invention have been described, it will be apparent to those skilled in the art that various modifications thereto can be made without departing from the spirit and scope of the invention as defined in the appended claims.

What is claimed is:

1. A method of generating a corrected gas flow value from a physical gas flow value for a gas moving through a duct, the method comprising the steps of:
   applying a laser-based sensor to an interior of the duct;
   measuring the physical gas flow value $W_{Physical}$ of the gas with the laser-based sensor;
   measuring with said laser-based sensor a static temperature T, a gas density $\rho$, and a velocity v of the gas in said interior of said duct;
   obtaining a standard day-value temperature $T_0$ and a standard day-value pressure $P_0$; and
   calculating the corrected gas flow value $W_{Corr}$ from the measured physical gas flow value, the static temperature T, the gas density $\rho$, the velocity v of the gas in said interior of said duct, the standard day-value temperature $T_0$, and the standard day-value pressure $P_0$.

2. The method of claim 1 wherein the value of $W_{Corr}$ is calculated from the following equation:

$$W_{Corr}=W_{Physical}\times(P_0/\sqrt{T_0})\times(T^{2.5}/(\rho R(v^2/7R+T)^3)),$$

wherein R is the Ideal Gas Constant.

3. The method of claim 1 wherein the step of applying said laser-based sensor system to the interior of the duct includes the steps of:
   placing a first photoemitter at a first position of the interior of the duct;
   placing a first photodetector at a second position of the interior of the duct opposite and at an angle upstream from said first photoemitter and facing said first photoemitter;
   placing a second photoemitter at a third position of the interior of the duct on the same side and upstream from said first photoemitter;
   placing a second photodetector at a fourth position of the interior of the duct opposite and at an angle downstream from said second photoemitter and facing said second photoemitter; and
   coupling said photoemitters and said photodetectors to a central processing unit programmed to convert signals therefrom into physical parameters of the gas.

4. The method of claim 3 wherein the step of calculating $W_{Corr}$ includes the steps of:
   programming said processing unit to generate through said first photoemitter a first light beam and through said second photoemitter a second light beam, wherein said first beam and said second beam are of a selectable frequency associated with characteristics of the gas;
   extracting absorption features of the gas based on light detection characteristics received from said photodetectors;
   numerically characterizing said absorption features and integrating the area associated with said absorption features; and
   calculating a density $\rho$ of the gas from said absorption feature integrating said area under said curve.

5. The method of claim 4 wherein the step of calculating $W_{Corr}$ further includes the steps of:
   determining a Doppler shift associated with a difference of the absorption features of said first beam and said second beam; and
   calculating a velocity of the gas from said Doppler shift.

6. The method of claim 5 wherein said photoemitters and said photodetectors are positioned at an angle with respect to the flow of the gas in the duct in the range from about 10° to about 60° from normal to the flow.

7. The method of claim 6 wherein said angle of said photoemitters and said photodetectors is about 45° from normal to the flow.

8. A sensor system for measuring a physical gas flow value $W_{Physical}$ of a gas flowing through a duct of a gas turbine engine and for calculating a corrected gas flow value $W_{Corr}$ from $W_{Physical}$, the sensor system comprising:
   a laser-based sensor affixed to an interior of the duct, wherein the laser-based sensor measures a static temperature T, a gas density ρ, and a velocity v of the gas in said interior of said duct;

means for obtaining a standard day-value temperature $T_0$ and a standard day-value pressure $P_0$; and a processor coupled to the laser-based sensor for controlling operation of the sensor, receiving signal information from the sensor, and calculating $W_{Physical}$ and $W_{Corr}$, wherein $W_{Corr}$ is calculated from the measured physical gas flow value, the static temperature T, the gas density ρ, the velocity v of the gas in said interior of said duct, the standard day-value temperature $T_0$, and the standard day-value pressure $P_0$.

9. The sensor system of claim 8 wherein said laser-based sensor includes
   a first photoemitter at a first position of the interior of the duct;
   a first photodetector at a second position of the interior of the duct opposite and at an angle upstream from said first photoemitter and facing said first photoemitter;
   a second photoemitter at a third position of the interior of the duct on the same side and upstream from said first photoemitter; and
   a second photodetector at a fourth position of the interior of the duct opposite and at an angle downstream from said second photoemitter and facing said second photoemitter.

10. The sensor system of claim 9 wherein said photoemitters and said photodetectors are positioned at an angle with respect to the flow of the gas in the duct in the range from about 10° to about 60° from normal to the flow.

11. The sensor system of claim 10 wherein said angle of said photoemitters and said photodetectors is about 45° from normal to the flow.

12. The sensor system of claim 11 wherein said processor is programmed to generate through said first photoemitter a first light beam and through said second photoemitter a second light beam, wherein said first beam and said second beam are of a selectable frequency associated with characteristics of the gas.

13. The sensor system of claim 12 wherein said processor is programmed to determine a Doppler shift associated with a difference of the absorption features of said first beam and said second beam and to then calculate a velocity of the gas from said Doppler shift.

14. The sensor system as claimed in claim 13 further comprising a second laser-based sensor operating at a frequency different from an operating frequency of said laser-based sensor, wherein said processor is programmed to determine a ratio of absorption features associated with the outputs from said laser-based sensor and said second laser-based sensor, to compare said ratio to a temperature reference value and calculate static temperature therefrom.

15. A method of generating a corrected gas flow value from a physical gas flow value for a gas moving through a duct, the method comprising the steps of:

applying a laser-based sensor to an interior of the duct;

measuring the physical gas flow value $W_{Physical}$ of the gas, a gas density ρ, and a velocity v of the gas in said interior of said duct with said laser-based sensor;

measuring with a conventional sensor system a stagnation temperature $T_T$;

obtaining a standard day-value temperature $T_0$ and a standard day-value pressure $P_0$; and calculating the corrected gas flow value $W_{Corr}$ from the measured physical gas flow value, the gas density ρ, the velocity v of the gas in said interior of said duct, the stagnation temperature $T_T$, the standard day-value temperature $T_0$ and the standard day-value pressure $P_0$.

16. The method of claim 15 wherein the value of $W_{Corr}$ is calculated from the following equation:

$$W_{Corr}=W_{Physical}\times(P_0/\sqrt{T_0})\times((T_T-(v^2/7R)^{2.5})/(\rho R T_T^3)),$$

wherein R is the Ideal Gas Constant.

17. A sensor system for measuring a physical gas flow value $W_{Physical}$ of a gas flowing through a duct of a gas turbine engine and for calculating a corrected gas flow value $W_{Corr}$ from $W_{Physical}$, the sensor system comprising:

a laser-based sensor affixed to an interior of the duct, wherein the laser-based sensor measures the physical gas flow value $W_{Physical}$ of the gas, a gas density ρ, and a velocity v of the gas in said interior of said duct with said laser-based sensor;

a conventional sensor system for measuring a stagnation temperature $T_T$;

means for obtaining a standard day-value temperature $T_0$ and a standard day-value pressure $P_0$; and a processor coupled to the laser-based sensor for controlling operation of the sensor, receiving signal information from the sensor, and calculating $W_{Physical}$ and $W_{Corr}$, wherein $W_{Corr}$ is calculated from the measured physical gas flow value, the gas density ρ, the velocity v of the gas in said interior of said duct, the stagnation temperature $T_T$, the standard day-value temperature $T_0$ and the standard day-value pressure $P_0$.

18. The system of claim 17 wherein the value of $W_{Corr}$ is calculated from the following equation:

$$W_{Corr}=WPhysical\times(P_0/\sqrt{T_0})\times((T_T-(v^2/7R)^{2.5})/(\rho R T_T^3)),$$

wherein R is the Ideal Gas Constant.

19. The system of claim 8 wherein the value of $W_{Corr}$ is calculated from the following equation:

$$W_{Corr}=W_{Physical}\times(P_0/\sqrt{T_0})\times(T^{2.5}/(\rho R(v^2/7R+T)^3)),$$

wherein R is the Ideal Gas Constant.

* * * * *